United States Patent [19]

Hare

[11] Patent Number: 5,106,945
[45] Date of Patent: Apr. 21, 1992

[54] POLYGLYCIDAMIDE-POLY(METH)-ACRYLOYL-POLYAMINE COMPOSITIONS

[75] Inventor: Clive H. Hare, Lakeville, Mass.

[73] Assignee: Monsanto Company, St. Louis, Mo.

[21] Appl. No.: 578,709

[22] Filed: Sep. 4, 1990

[51] Int. Cl.$^5$ ............................................. C08G 59/18
[52] U.S. Cl. .............................. 528/332; 252/182.18; 252/182.23; 252/182.28; 528/266; 528/392; 528/407
[58] Field of Search ...................... 252/182.18, 182.23, 252/182.28; 528/266, 69, 392, 332, 407

[56] References Cited

U.S. PATENT DOCUMENTS

| | | | |
|---|---|---|---|
| 4,051,195 | 9/1977 | McWhorter | 260/837 |
| 4,547,562 | 10/1985 | Nichols | 528/119 |
| 4,910,269 | 3/1990 | Waddill | 525/532 |

FOREIGN PATENT DOCUMENTS 2068001  8/1981  United Kingdom .

*Primary Examiner*—Maurice J. Welsh
*Assistant Examiner*—Rachel Johnson
*Attorney, Agent, or Firm*—R. Bruce Blance; William J. Farrington; Richard H. Shear

[57] ABSTRACT

High solids compositions are described comprising a glycidamide containing more than one glycidamide group per molecule, a (meth)-acryloyl compound containing more than one (meth)-acryloyl group per molecule and a non-aromatic amine containing more than 2 amine hydrogen atoms per molecule. The compositions can be applied in coating, adhesive and laminating applications. They cure rapidly at room temperature to provide smooth, glossy, weather resistant surfaces.

28 Claims, No Drawings

POLYGLYCIDAMIDE-POLY(METH)-ACRYLOYL-POLYAMINE COMPOSITIONS

This invention relates to high solids curable compositions comprising polyglycidamides and poly(meth)-acryloyl compounds and more particularly to such compositions containing polyamines as the curing agent.

U.S. Pat. No. 4,051,195 to W. F. McWhorter teaches curable epoxy resin compositions comprising (1) a blend of a bisphenol A epoxy resin and a polyacrylate or polymethacrylate ester of a polyol wherein the ester contains more than one terminal acrylate or methacrylate and (2) an aliphatic polyamine curing agent. The weight ratio of epoxide resin: ester is 100:5 to 100:100. The aliphatic polyamine is incorporated into the resin composition in a specified amount. The epoxy resin compositions are said to cure rapidly even at low temperature and are useful as coatings and adhesives.

G. B. Patent 2068001 teaches high solids coating compositions comprising bisphenol A epoxy resins, poly(meth)-acryloyl compounds and cycloaliphatic polyamines characterized by long pot-life and low exothermicity.

U.S. Pat. No. 4,547,562 discloses solventless compositions comprising adducts of mono-, di- or poly-amines with mono-, di- or poly-acryloyl compounds or epoxides. The solventless compositions solidify within several hours at ambient temperature.

Cycloaliphatic epoxy resins prepared by the hydrogenation of glycidyl ethers of bisphenol A or other di- or polyphenols may be reacted with selective curatives to form coatings that are resistant to UV degradation. These resins are much less reactive with conventional epoxy curatives than are the phenolic-based glycidyl ethers. U.S. Pat. No. 4,910,269 teaches curable cycloaliphatic epoxy resin compositions comprising epoxy resin, polyacrylate and a polyether polyamine in which the reactivity of the system is enhanced by the addition of a piperazine accelerator such as piperazine and N-aminoethyl-piperazine.

While aliphatic and cycloaliphatic epoxies impart some improvement in light stability to these compositions, the light stability falls far short of the performance obtained with urethane systems. On the other hand, the extreme toxicity of the isocyanate components of such urethane systems mandates extraordinary precautions for their safe use.

I have now found that curable compositions are obtained with resin compositions comprising a glycidamide containing more than one glycidamide group per molecule an acryloyl compound containing more than one acryloyl group per molecule selected from $CH_2=CHCO$, $CH_2=C(CH_3)CO$ and $CH_2=C(C_2H_5)CO$ and a non-aromatic amine containing more than 2 amine hydrogen atoms per molecule. The cured compositions are characterized by their superior light stability. The curable compositions are capable of fast cure without the need for a piperazine accelerator and provide the advantage of high solids compositions and reduced generation of volatile organic compounds when they are used as coating compositions. The curable compositions may also be used in laminate and adhesive applications.

THE GLYCIDAMIDE

Any glycidamide containing a plurality of glycidamide groups per molecule can be used in the compositions of the present invention. Preferred are polyglycidamide derivatives of amino compounds such as urea, glycouril and aminotriazines for example melamine and benzoguanamine, in which the glycidamide is lined to the amino compound by a methylene group. Such glycidaminomethyl amino compounds include those disclosed in U.S. Pat. No. 4,582,894. They are represented by the structural formula $Y(R)_m$, wherein Y is a nucleus selected from the group consisting of:

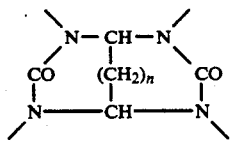

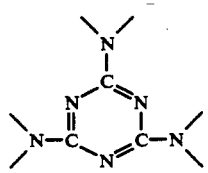

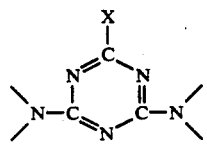

and

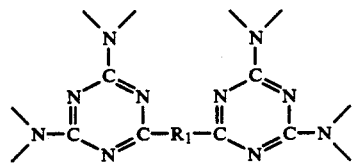

wherein R is selected from the group consisting of:

$(CH_2O)_pR_2$  A.

$$CH_2N\underset{R_4}{\overset{R_3}{|}}-COC=CH_2;$$  B.

$$CH_2NCOC\underset{R_4}{\overset{R_3}{|}}\overset{O}{\diagup\diagdown}CH_2;$$  C.

and $(CH_2O)_qCH_2R_5$  D.

wherein $R_1$ is a $C_1$ to $C_{10}$, linear or branched or cyclic, saturated or unsaturated or epoxidized, divalent hydrocarbyl radical;

wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H;

wherein $R_3$ and $R_4$ are individually selected from hydrogen and methyl;

wherein $R_5$ is $[Y(R)_{m-2}(CH_2O)_r-CH_2-]_s-Y(R)_{m-1}$;

wherein X is H or a $C_1$ to $C_{10}$, linear or branched or cyclic, saturated or unsaturated or epoxidized, aliphatic or aromatic monovalent hydrocarbyl radical;

wherein m is the equivalence of the Y nucleus and is in the range of 4 to 8;

wherein n, p, q and r are individually in the range of 0 to 1;

wherein the average is is in the range of 0 to 2;

wherein the average number of A groups per Y nucleus is in the range of 1 to $m-1$, the average number of B groups per Y nucleus is in the range of 0 to $m-2$, the average number of C groups per Y nucleus is in the range of 1 to $m-1$ and wherein the average number of Y nuclei per molecule is in the range of about 1 to about 4 and the average number of C groups per molecule is in the range of about 1.2 to about 10. Preferably the average number of C groups per molecule is in the range of about 2 to about 6. Optionally up to one $R_2$ group per Y nucleus can be a $C_2$ to $C_{12}$ alkylene or cycloalkylene group to provide bridging between two Y nuclei.

Suitable Y nuclei are provided by melamine, N-alkyl melamines such as N,N',N''-trimethyl melamine, guanamines such as acetoguanamine, benzoguanamine, glutaroguanamine, and adipoguanamine, and cyclic ureas such as glycouril (the condensation product of glyoxal and urea), and the condensation product of malonaldehyde and urea.

The polyglycidamide of this invention can be prepared by methylolating cyclic ureas and aminotriazines with formaldehyde, etherifying with a $C_1$ to $C_{10}$ alcohol, such as methanol, ethanol, propanol, butanol, pentanol, or 2-ethyl-1-hexanol, transetheramidizing with an alpha,beta unsaturated amide such as acrylamide and epoxidizing with a peroxide, such as hydrogen peroxide in the presence of a coreactive nitrile such as acetonitrile. If $R_1$, $R_2$ or X is an ethylenically unsaturated radical, some epoxidation of the double bond occurs.

The preferred polyglycidamides are oligomeric mixtures, in which Y is a melamine nucleus, the A group is $CH_2OR_2$ or H, $R_2$ being methyl, butyl, pentyl, or 2-ethylhexyl, the B group is $CH_2NHCOCH=CH_2$ and the C group is

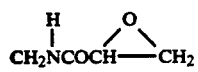

there being on average 0 to 1 H groups, 1 to 3 $CH_2OR$ groups, 0 to 1 B groups and 2 to 3 C groups, per melamine nucleus and the average number of melamine nuclei per molecule being in the range of about 1 to about 3.

THE ACRYLOYL COMPOSITION

The acryloyl composition useful in the curable compositions of the present invention can be an unsaturated monomer or oligomer or mixture of monomers and oligomers. The nature of the compound is not critical so long as it is capable of addition to a primary or secondary amine by the Michael addition reaction. Suitable acryloyl compositions advantageously have a number average molecular weight less than about 4000, preferably less than about 1000, and contain from 1 to 10 unsaturated groups per molecule, and preferably from 2 to 10 such groups per molecule. A particularly preferred group of (meth)-acryloyl monomers is represented by the structure:

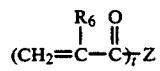

where $R_6$ is selected from the group consisting of H, $CH_3$ and $C_2H_5$, where t is an integer in the range of 2 to 10 and Z is a saturated or ethylenically unsaturated residue of a polyol, a poly(carboxylic acid), a polyamine, polyepoxide, a polyisocyanate or a polymethylol amino resin, of a number average molecular weight less than about 4000, preferably less than about 1000, containing a hydrocarbon, ester, amide, ether, urethane or amino resin backbone. Preferably the Z radical is an aliphatic of cycloaliphatic radical. The monomers may be obtained by reaction of acryloyl or methyacryloyl chloride with a polyol, or a polyamine, or by the reaction of acrylic acid, methacrylic acid, acrylamide or methacrylamide with a polyepoxide, or a polyisocyanate, or by reaction of a hydroxyalkyl acrylate or methacrylate with a polycarboxylic acid, a polyepoxide, a polyisocyanate, a polymethylol amino resin, or a polymethoxymethyl amino resin. Such (meth)-acryloyl compositions include 1,3-butylene glycol diacrylate, 1,6-hexanediol diacrylate, the polyacrylates and polymethacrylates of polyethylene glycols and polyols, polypropylene glycols and polyols and poly(tetramethylene glycols) and poly(tetramethylene)polyols of molecular weight in the range of 100 to 4000, pentaerythritol tetraacrylate, trimethylolpropane triacrylate, dipentaerythritol monohydroxypentaacrylate, ethoxylated bisphenol A dimethacrylate, the diacrylates, dimethacrylates and diethacrylates of epoxy compounds formed from bisphenol A and epichlorohydrin of molecular weight in the range of 200 to 4000, the polyacryloyl monomers prepared by reacting isocyanate capped polyethers and isocyanate capped polyesters of molecular weight up to 4000 with hydroxyethyl(meth)-acrylate, and the polyacryloyl monomers prepared by reacting (meth)-acrylic acid, (meth)-acrylamide or hydroxyethyl (meth)-acrylate with polymethoxyalkyl amino resins such as hexamethoxymethyl melamine.

THE NON-AROMATIC AMINE

The amine component of the composition of the present invention is any non-aromatic amine capable of curing a mixture of the glycidamide and the (meth)-acryloyl compound. The term "non-aromatic amine" means an amine wherein the amine nitrogen is neither a member of an aromatic ring nor directly linked to a carbon atom of an aromatic ring. Advantageously, the amine has an equivalent weight in the range of about 15 to about 1000 and the number of amine hydrogen atoms per molecule or equivalence in the range of about 2.2 to about 10. Useful amines include diamines such as hydrazine; ethylenediamine; 1,4-butylenediamine; 1,6-hexamethylenediamine; Amine-6 (which is a mixture of: 1,6-hexamethylenediamine; 2-methyl-1,5-pentamethylenediamine; and 1,2-cyclohexamethylenediamine); isophoronediamine; trimethyl-1,6-hexamethylene diamine; N,N'-bis-(2-aminoethyl)piperazine; paramenthanediamine; 1,3-bis-(aminoethyl)cyclohexane; 1,4- diaminocyclohexane; bis-(4-amino-3-methylcyclohexyl)methane; 2,2'-bis-(4-aminocyclohexyl)propane; and polyoxypropylene diamine-230, 400, 600, 900, 2000, (known as Jeffamines which are produced by Texaco Chemical Co.). The adducts of any of these specific diamines with mono-, di- or poly(meth)-acryloyl compounds by reacting at least 2 equivalents of diamine per acryloyl group can be used. For example, the diamines which are obtained by mixing 2.0 moles of 1,6-hexamethylenediamine and 1.0 mole 1,6-hexamethylene diol dimethacrylate.

Other illustrative diamines are the condensation products of fatty acids and diamines such as the products obtained by reaction of 1.0 mole oxalic acid, adipic acid, azelaic acid, sebacic acid, dodecanedioic acid, dimer fatty acid, isophthalic or terephthalic acids (or their dimethyl esters) with 2.0 moles of a diamine such as 1,6-hexamethylenediamine or polyoxypropylenediamine-400 (Jeffamine D-400) through the elimination of 2.0 moles of water (or methanol). Other illustrative diamines are urea hydrazine, the dihydrazide of dimer fatty acid and the like.

Illustrative examples of tri(or poly)amines are: diethylenetriamine, dipropylenetriamine, polyoxypropylenetriamine-400 (Jeffamine T-403, a product of Texaco Chemical Co.), triethylenetetramine (TETA), tetraethylenepentamine, and dihexamethylenetriamine (BHMT, a product of the du Pont Company). Additional tri or poly amines include the adducts obtained from the addition reaction of 2.0 moles of TETA with 1.0 mole of tetraoxyethylene glycol dimethacrylate; the adduct of 3.0 moles of 1,6-hexamethylenediamine with 1.0 mole of trimethylolpropane triacrylate; the adduct of 3 moles of isopropyl amine with 1 mol of trimethylolpropane triacrylate; the condensation reaction product of 1.0 mole dimer fatty acid, adipic acid, oxalic acid, terephthalic acid, or trimellitic anhydride with 2.0 moles of Jeffamine t-403 or 1.0 mole urea with 2.0 moles of Jeffamine T-403.

The most preferred polyoxyalkylene polyamines are polyoxypropylenediamines having a molecular weight of about 230 or a triamine of molecular weight about 400. These products are available under the tradename JEFFAMINE® D-230 and JEFFAMINE® T-403 from Texaco Chemical Co. Their use as curing agents is described in U.S. Pat. No. 4,189,564.

JEFFAMINE® D-230 is represented by the formula:

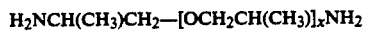

wherein x averages 2.6.

JEFFAMINE® T-403 is represented by the formula:

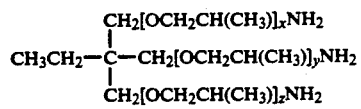

wherein x+y+z averages 5.3.

While any ratio of reactants can be used that provides a curable composition, advantageously the range of compositions is selected to provide an equivalent ratio of acryloyl compound to glycidamide in the range of about 0.1 to about 1.5 and an equivalent ratio of amine to acryloyl compound and glycidamide in the range of about 0.3 to about 1.5. Preferably the equivalent ratio of acryloyl compound to glycidamide is in the range of about 0.2 to about 0.8 and the equivalent ratio of amine to acryloyl compound and glycidamide is in the range of about 0.7 to about 1.3.

Since the curable composition of the present invention gels and solidifies within hours of being mixed, it can be convenient to provide the composition as a two component pack to be mixed immediately prior to use batch-wise or continuously by means of a two component mixer-applicator or a spray gun. When the composition is provided as a two component pack, it is advantageous to form a first package from a mixture of the glycidamide and the acryloyl compound and a second package from the non-aromatic amine. Optionally some of the acryloyl compound can be reacted with the non-aromatic amine to provide a chain extended amine in the second package and reduce the exotherm associated with the curing reaction when the first and second packages are mixed.

The compositions of the present invention may be used in adhesive and surface coating applications, and in the preparation of prepregs and laminates comprising suitable reinforcing agents such as glass fiber scrim and cloth. While the compositions may be diluted with solvent to provide suitable coating or impregnation viscosity, much less solvent is required than is required for compositions comprising the glycidamide cured with a polyamine. The solvent is preferably a volatile organic compound selected from alcohols such as n-butanol and iso-butyl alcohol; glycol ethers such as propylene glycol monomethyl ether and ethylene glycol monomethyl ether, ketones, such as acetone, methyl ethyl ketone, and methyl isobutyl ketone; esters such as ethylene glycol monoethyl ether acetate; aromatic solvents such as toluene and xylene; or a mixture of any such solvents.

The application of the curable composition of the present invention as a coating to a substrate may be executed by any conventional method such as by brushing, roller coating, spraying with compressed air or airless spraying or with a petroleum solvent of low boiling point or electrostatic spraying. The composition may be applied as a coating to a variety of materials such as wood, paper, paper board, glass, metal, stone, plastics and cloth.

Depending on the end use and the application requirements it may be convenient to add any of the other conventional additives for curable compositions such as pigments, fillers, reinforcing agent, UV absorbers, stabilizers, inhibitors, thixotropes, dispersants, flow control agents, catalysts and reaction rate moderators.

Practical and presently preferred embodiments of the present invention are shown for illustration in the following Examples wherein parts and percentages are by weight unless otherwise indicated.

EVALUATION OF CURED COMPOSITIONS

Tack-free time is time taken by a coating composition to reach a condition where it is no longer tacky to finger pressure.

Solvent resistance of cured composition is measured by rubbing the coating with felt tip pen soaked with methyl ethyl ketone and is stated as the number of double rubs which are required to break through the coating.

Gloss is measured at 60° and 20° according to ASTM-D573. Results are given in percent (%) for the two angles.

Tukon hardness is measured according to ASTM-D1474. The values are in Knoop hardness units.

Sward hardness is measured according to Canadian government Speicification 1-GP-71. Values between 10 and 30 are satisfactory.

T-blend flexibility is measured according to National Coil Coaters Association, standard T-bend test method, Technical Bulletin II-19.

Light stability is measured by ASTM G-53-84 using a QUV Weatherometer.

Pot Life is the time taken to reach a viscosity of 5000 cps. (5.0 Pa sec)

Reverse impact cross hatch testing is conducted at 120 in/lb (13.6 J) impact force, using a 4 pound (1.81 kg) bullet. Scotch® 610 tape (3M) is used for adhesion testing. Results are expressed on a scale of 1 (worst) to 5 (best).

EXAMPLE 1

65 parts by weight of 61 weight percent solution in propylene glycol monomethyl ether of a glycidaminomethyl alkoxymethyl melamine of epoxy equivalent (FEW) 319, containing 2 glycidaminomethyl groups, 1 methoxymethyl group, 1 n-butoxymethyl group, and 1 n-pentoxymethyl group per melamine nucleus is blended with 18.8 parts by weight of an acryloyloxy polyester of acryloyl equivalent weight 150, sold by Sartomer under the registered trademark Sartomer C-2000, 28.3 parts by weight of a cycloaliphatic amine of equivalent weight 113 sold by Anchor-Pacific Inc. under the registered trademark Ancamine 1618 and 15.7 parts by weight of methyl isobutyl ketone to provide a resin solution of 68 weight percent solids. The blend has a pot-life of 3 hours. The blend is coated on test panels to provide a dry film thickness of 1.5 to 2.0 mils (38 to 50 microns) and allowed to cure under ambient conditions. The tack free time is 60 minutes. Data obtained from evaluation of the coating are presented in Table 2.

COMPARATIVE EXAMPLES C1-9

Example 1 is repeated in a series of comparative examples with sorbitol based epoxy resin sold by Ciba Geigy under the registered trademark Araldite XU-GY358, a hydrogenated bisphenol A epoxy resin sold by Shell Chemical Company under the registered trademark Eponex 1513, a bisphenol A epoxy resin sold by Shell Chemical Company under the registered trademark Epon 828 and an aliphatic epoxy resin sold by Cray Valley Products Limited under the registered tradeark Synocure 8985A. Included in the series are compositions containing epoxy resin and amine curing agent without the acryloyl compound Sartomer 2000. The equivalent ratio of amine to epoxy resin and acryloyl compound is 1, and the equivalent ratio of epoxy resin to acryloyl compound in those compositions containing acryloyl compound is also 1. The coating compositions are listed in Table 1. The data obtained in evaluation of the compositions as surface coatings are presented in Table 2. The solvent resistance of all the examples was greater than 100 double-rubs (MEK).

TABLE 1

| | Epoxy Resin Coating Compositions | | | | | | | | | |
|---|---|---|---|---|---|---|---|---|---|---|
| | Example | | | | | | | | | |
| | 1 | C1 | C2 | C3 | C4 | C5 | C6 | C7 | C8 | C9 |
| Part A | | | | | | | | | | |
| Glycidamido melamine resin (EEW319; 61%) | 65.1 | 70.0 | — | — | — | — | — | — | — | — |
| Araldite XU-GY358 (EEW196) | — | — | 26.4 | 24.5 | — | — | — | — | — | — |
| Eponex 513 (EEW235) | — | — | — | — | 31.6 | 29.4 | — | — | — | — |
| Epon 828 (EEW190) | — | — | — | — | — | — | 25.6 | 23.8 | — | — |
| Synocure 8985A (EEW265) | — | — | — | — | — | — | — | — | 59.4 | 55.1 |
| Sartomer C-2000 (EW150) | 18.8 | — | — | 18.8 | — | 18.8 | — | 18.8 | — | 18.8 |
| Part B | | | | | | | | | | |
| Ancamine 1618 (AHEW113) | 28.3 | 15.2 | 15.2 | 28.3 | 15.2 | 28.3 | 15.2 | 28.3 | 15.2 | 28.3 |
| MIBK | 15.7 | — | 19.6 | 33.7 | 22.0 | 36.0 | 19.1 | 33.3 | — | 15.7 |
| Solids, % | 68.0 | 68.2 | 68.0 | 68.0 | 68.0 | 68.0 | 68.0 | 68.0 | 68.1 | 68.0 |

TABLE 2

| | | | | | Evaluation of Epoxy Resin Compositions | | | |
|---|---|---|---|---|---|---|---|---|
| Example | TFT hrs. | Pot-life hrs. | Tukon Hardness | X-Latch Adhesion | Impact F/R in-lb (J) | Initial gloss 60°/20° | Condensing Humidity 38° C., 120 hrs | QUV(500 hrs) 60°/20° |
| 1 | 1 | 3 | 2.6 | 3B | 140/100 (15.8/11.3) | 85.2/66.5 | 9 | 94/83 |
| C1 | 0.33 | 0.33 | 8.9 | 0B | — | 94.2/80.3 | N.C. | 48/36 |
| C2 | 10 | 10 | 8.3 | 0B | 60/20 (6.8/2.3) | 94.8/71 | F9 | 89/65 |
| C3 | 24 | 42 | 0.6 | 5B | 160/160 (18.1/18.1) | 86.5/65.0 | F9 | 86/67 |
| C4 | 22 | 144 | 7.8 | 4B | 40/10 (4.5/1.1) | 83.0/56.9 | VF9 | 3/1 |
| C5 | 48 | 168 | too soft | 5B | 160/160 (18.1/18.1) | 88.8/71.4 | VF9 | 82/52 |
| C6 | 4 | 48 | 15.9 | 1B | — | 98.2/65.5 | N.C. | 18/5 |

TABLE 2-continued

Evaluation of Epoxy Resin Compositions

| Example | TFT hrs. | Pot-life hrs. | Tukon Hardness | X-Latch Adhesion | Impact F/R in-lb (J) | Initial gloss 60°/20° | Condensing Humidity 38° C., 120 hrs | QUV(500 hrs) 60°/20° |
|---|---|---|---|---|---|---|---|---|
| C7 | 22 | 96 | 3.9 | 5B | 140/140 (15.8/15.8) | 92.6/73.3 | F9 | 5/1 |
| C8 | 1.5 | 5.5 | 6.8 | 0B | 20/— (2.3/—) | 77.6/51.4 | N.C. | 30/4 |
| C9 | 6.5 | 22 | 2.2 | 1B | 160/160 (18.1/18.1) | 49.6/22.7 | N.C | 28/12 |

The data demonstrate that the addition of the acryloyl compound to the glycidamidomethyl melamine resin to provide a composition within the scope of the present invention increases the pot-life and the track free time moderately. However curing is quite fast without the need for a cure accelerator. The data demonstrate the enhanced light and weather resistance, as measured by the QUV exposure tests of the composition of the present invention obtained by the inclusion of the acryloyl compound and show the marked superiority of the composition in comparison with similar compositions containing commercially available aromatic and non-aromatic epoxy resins.

EXAMPLES 2-7

This series of examples is carried out with compositions similar to example 1, using an equal weight of various acryloyl compounds in place of Sartomer 2000 resin. Pot-lives are in the range of 2 to 4 hours. Rapid cure is obtained when the compositions are coated on test panels. The compositions are set forth in Table 3 and the evaluation data in Table 4 show that high levels of gloss are achieved in the coatings.

TABLE 3

Compositions of Example 2-7

| | Example | | | | | |
|---|---|---|---|---|---|---|
| | 2 | 3 | 4 | 5 | 6 | 7 |
| Part A | | | | | | |
| Glycidamidomethyl melamine resin (EEW 319, 61%) | 70 | 70 | 70 | 70 | 70 | 70 |
| Sartomer C-2000, EW 150 | 11 | — | — | — | — | — |
| AB cure 2210A[1], EW — | — | 11 | — | — | — | — |
| Ebecryl 2905[2], EW — | — | — | 11 | — | — | — |
| Acrylamidomethyl melamine resin, EW 340 | — | — | — | 11 | — | — |
| Acrylamidomethyl melamine resin, EW 260 | — | — | — | — | 11 | — |
| Acrylamidomethyl melamine resin, EW 300 | — | — | — | — | — | 11 |
| Part B | | | | | | |
| Ancamine 1618 AHEWM3 | 15.2 | 15.2 | 15.2 | 15.2 | 15.2 | 15.2 |
| MIBK | 5.0 | 5.0 | 5.0 | 5.0 | 5.0 | 5.0 |

[1]AB cure 2210 is a di-acryloyl aliphatic urethane, sold by American Biltrite Inc.
[2]Ebercyl 2905 is a di-acryloyl aliphatic urethane, sold by UCB S.A.

TABLE 4

Evaluation of Examples 2-7

| Example | TFT (mins) | Tukon hardness | X-hatch adhesion | Gloss 60°/20° |
|---|---|---|---|---|
| 2 | 80 | 4.8 | 4B | 91.3/79.2 |
| 3 | 53 | 8.9 | 4B | 90.2/67.7 |
| 4 | 39 | 11.4 | 3B | 90.2/73.8 |
| 5 | 34 | 9.9 | 2B | 93.2/76.0 |
| 6 | 36 | 9.8 | 2B | 94.1/78.0 |
| 7 | 33 | 9.9 | 2B | 92.8/82.3 |

EXAMPLE 8

Part A of a pigmented composition is prepared by blending 2406 parts by weight of the glycidamidomethyl melamine resin of Example 1 (61% solids), 1303 parts by weight of titanium dioxide, 188 parts by weight of Sartomer C-2000, 24 parts by weight of a thixotrope sold by Rheox, Inc. under the tradename Thixatrol SR-100, 11 parts by weight of a flow control agent sold by the Minnesota Mining and Manufacturing Company under the tradename Fluorad FC-430 and 362 parts by weight of propyleneglycol monomethyl ether sold by the Dow Chemical Company under the tradename Dowanol PM. Part B is prepared by blending 494 parts by weight of Ancamine 1618, 42 parts by weight of a light stabilizer sold by Ciba-Geigy under the tradename Tinuvin 1130 and 18 parts by weight of light stabilizer Tinuvin 292.

Parts A and B are blended to provide a 73 percent solids composition which is coated on test panels to provide a dry film thickness in the range of 1.5-2 mil (38-51 microns). The data obtained from evaluation of the cured coating are presented in Table 6.

EXAMPLES 9-15

Examples 9-15 are prepared as set forth in Example 8 with variation in the amounts of the components of the curable composition while maintaining the same concentration of the curable composition, the titanium dioxide pigment and the stabilizers and additives. The compositions of the Examples are set forth in Table 5. Data obtained from coating evaluations are set forth in Table 6.

TABLE 5

Compositions of Examples 8-15

| | Example No. | | | | | | | |
|---|---|---|---|---|---|---|---|---|
| | 8 | 9 | 10 | 11 | 12 | 13 | 14 | 15 |
| Part A | | | | | | | | |
| Glycidamidomethyl melamine resin, EEW320 | 2406 | 2750 | 1375 | 1832 | 2200 | 1375 | 2750 | 3438 |
| Thixatrol SR 1000 | 24 | 26 | 20 | 23 | 24 | 21 | 25 | 27 |
| Fluorad FC-430 | 11 | 12 | 9 | 11 | 11 | 9 | 12 | 12 |
| Titanium dioxide | 1303 | 1420 | 1085 | 1251 | 1287 | 1131 | 1336 | 1492 |

TABLE 5-continued

Compositions of Examples 8-15

| | Example No. | | | | | | | |
|---|---|---|---|---|---|---|---|---|
| | 8 | 9 | 10 | 11 | 12 | 13 | 14 | 15 |
| Sartomer 2000 | 188 | 375 | 188 | 500 | 300 | 375 | — | 188 |
| Dowanol PM | 362 | 342 | 554 | 537 | 428 | 598 | 256 | 115 |
| Part B | | | | | | | | |
| Ancamine 1618 | 494 | 283 | 706 | 377 | 452 | 565 | 565 | 283 |
| Tinuvin 1130 | 42 | 46 | 36 | 40 | 42 | 38 | 44 | 48 |
| Tinuvin 292 | 18 | 19 | 15 | 17 | 18 | 16 | 19 | 20 |
| Part A & B | | | | | | | | |
| Acryloyl: epoxy equivalent ratio | .286 | .5 | .5 | 1 | .5 | 1 | 0 | .2 |
| Amine: acryloyl & epoxy equivalent ratio | .778 | .33 | 1.66 | .5 | .67 | 1 | 1 | .33 |

TABLE 6

Evaluation of Coating Examples 8-15

| Example | TFT hrs. | Pot-life hrs. | Sward Hardness | X-hatch Adhesion | Impact Resistance F, in-lb (J) | Flexibility | Reflectance 0 hrs/272 hrs | QUV 20° gloss 0 hrs/272 hrs |
|---|---|---|---|---|---|---|---|---|
| 8 | 4.5 | 3.25 | 59 | 4.6 | 142(16) | Pass ¼" (6.4 mm) Fail ⅛" (3.2 mm) | 94.6/93.9 | 78.1/52.3 |
| 9 | 33 | 33 | 15 | 4.0 | 120(14) | Pass ⅛" (3.2 mm) | 94.8/94.2 | 76.1/57.6 |
| 10 | 2.7 | 2.1 | 34.8 | 4.9 | 172(19) | Pass ⅛" | 94.8/90.0 | 43.8/0.8 |
| 11 | 15 | 17 | 14 | 4.7 | 172(19) | Pass ⅛" | 93.9/93.5 | 72.3/67.8 |
| 12 | 7.3 | 5.8 | 27.2 | 4.9 | 172(19) | Pass ⅛" | 94.7/94.3 | 72.9/67.6 |
| 13 | 8 | 6 | 4.8 | 5 | 172(19) | Pass ⅛" | 94.00/92.2 | 50.7/47.2 |
| 14 | 2 | 1.75 | 50.4 | 4.6 | 58(6.6) | Pass 1" (25 mm) Fail ¾" (19 mm) | 94.5/94.9 | 70.4/15.6 |
| 15 | 30 | 29 | 12.4 | 4.6 | 56(6.3) | Pass 1" Fail ¾" | 95.00/94.8 | 74.1/51.0 |

The data suggest that higher levels of hardness are obtained with compositions containing low concentrations of acryloyl compound and with amine hydrogen approximately equivalent to the sum of glycidamide and acryloyl equivalents. Cure time is increased with increasing concentration of acryloyl compound and decreasing concentrations of amine. Impact resistance and adhesion are enhanced by moderate concentrations of the acryloyl compound especially in compositions with amine hydrogen approximately equivalent to the sum of glycidamide and acryloyl equivalent. Gloss is increased in compositions containing moderate levels of acryloyl compound and substantially less than the stoichiometric amount of amine; gloss retention is far superior to the gloss retention of conventional epoxy resins.

EXAMPLES 16-23

A series of compositions similar to examples 8-15 is prepared except for the replacement of Ancamine 1618 with a polyoxypropylene amine of equivalent weight 90 sold by Thermoset Plastics, Inc. under the tradename Thermoset 65. The compositions of the series are set forth in Table 7 and coating evaluation data are presented in Table 8.

TABLE 7

Compositions of Examples 16-23

| | Example No. | | | | | | | |
|---|---|---|---|---|---|---|---|---|
| | 16 | 17 | 18 | 19 | 20 | 21 | 22 | 23 |
| Part A | | | | | | | | |
| Glycidamido-methyl melamine resin, EEW320 | 2406 | 2750 | 1375 | 1832 | 2200 | 1375 | 2750 | 3438 |
| Thixatrol SR1000 | 23 | 26 | 19 | 22 | 23 | 20 | 23 | 26 |
| Fluorad FC-430 | 11 | 12 | 8 | 10 | 11 | 9 | 11 | 12 |
| Titanium dioxide | 1261 | 1420 | 1024 | 1222 | 1248 | 1079 | 1284 | 1469 |
| Sartomer 2000 | 188 | 375 | 188 | 500 | 300 | 375 | — | 188 |
| Dowanol PM | 341 | 342 | 508 | 528 | 408 | 567 | 226 | 98 |
| Part B | | | | | | | | |
| Thermoset 65 | 394 | 283 | 563 | 300 | 360 | 450 | 450 | 225 |
| Tinuvin 1130 | 42 | 46 | 34 | 40 | 40 | 36 | 42 | 48 |
| Tinuvin 292 | 18 | 19 | 14 | 17 | 17 | 15 | 18 | 20 |
| Part A & B | | | | | | | | |
| Acryloyl: epoxy equivalent ratio | .286 | .5 | .5 | 1 | .5 | 1 | 0 | .2 |

TABLE 7-continued

Compositions of Examples 16-23

| | Example No. | | | | | | | |
|---|---|---|---|---|---|---|---|---|
| | 16 | 17 | 18 | 19 | 20 | 21 | 22 | 23 |
| Amine: acryloyl & epoxy equivalent ratio | .778 | .33 | 1.66 | .5 | .67 | 1 | 1 | .33 |

TABLE 8

Evaluation of Coating Examples 16-23

| Example | TFT hrs. | Pot-life hrs. | Sward Hardness | X-hatch Adhesion | Impact Resistance F, in-lb (J) | Flexibility | Reflectance 0 hrs/272 hrs | QUV 20° gloss 0 hrs/272 hrs |
|---|---|---|---|---|---|---|---|---|
| 16 | 7.8 | 6.5 | 32 | 4.5 | 168 | Pass ⅛" | 92.50/90.6 | 83.0/66.1 |
| 17 | 27 | 24.5 | 11.2 | 4.5 | 172 | Pass ⅛" | 94.50/92.5 | 83.7/46.2 |
| 18 | 7.8 | 6.80 | 2.40 | 5.0 | 172 | Pass ⅛" | 92.70/86.2 | 81.5/45.4 |
| 19 | 17 | — | 10.40 | 4.6 | 172 | Pass ⅛" | 94.50/91.8 | 74.6/32.6 |
| 20 | 7.0 | 6.50 | 21.20 | 4.9 | 172 | Pass ⅛" | 94.30/92.0 | 83.9/77.5 |
| 21 | 14.0 | 11.0 | 7.20 | 5.0 | 172 | Pass ⅛" | 94.10/90.7 | 75.7/70.4 |
| 22 | 4.0 | 3.25 | 42.0 | 4.0 | 44 | Pass ⅛" | 94.50/93.0 | 79.3/62.5 |
| 23 | 24.0 | 25.0 | 15.2 | 4.8 | 40 | Pass ⅛" | 94.40/92.9 | 80.3/22.1 |

The data suggest that cure time increases with increased concentration of the acryloyl compound. Hardness is favored by compositions low in acryloyl compound containing an amine hydrogen content approximately stoichiometric to substantially less than stoichiometric, while gloss is favored by compositions low in acryloyl compound, containing an amine hydrogen content approximately stiochiometric to substantially more than stoichiometric. Again gloss and gloss retention are significantly greater than the gloss obtained from conventional aromatic epoxy systems.

What is claimed is:

1. A curable composition comprising a glycidamide containing more than one glycidamide group per molecule, an acryloyl compound containing more than one acryloyl group per molecule selected from $CH_2=CHCO$, $CH_2=C(CH_3)CO$ and $CH_2=C(C_2H_5)CO$ and a non-aromatic amine containing more than 2 amine hydrogen atoms per molecule, wherein the equivalent ratio of acryloyl compound to glycidamide is in the range of about 0.1 to about 1.5 and wherein the equivalent ratio of amine to acryloyl compound and glycidamide is in the range of about 0.3 to about 1.5.

2. The curable composition of claim 1 wherein the glycidamide is represented by the formula $Y(R)_m$, wherein Y is a nucleus selected from the group consisting of:

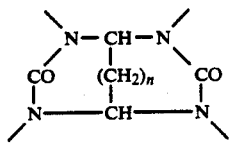

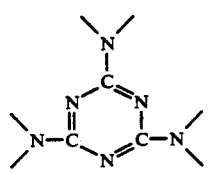

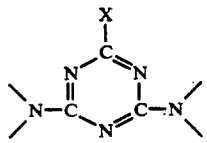

and

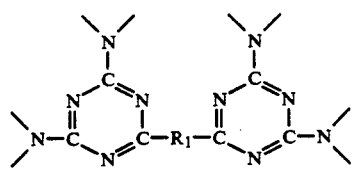

wherein R is selected from the group consisting of:

  A.

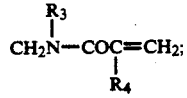  B.

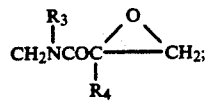  C.

and

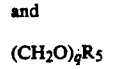  D.

wherein $R_1$ is a $C_1$ to $C_{10}$, linear or branched or cyclic, saturated or unsaturated or epoxidized, divalent hydrocarbyl radical;

wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H;

wherein $R_3$ and $R_4$ are individually selected from hydrogen and methyl;

wherein $R_5$ is $[Y(R)_{m-2}(CH_2O)_r-CH_2]_s-Y(R)_{m-1}$;

wherein X is H or a $C_1$ to $C_{10}$, linear or branched or cyclic, saturated or unsaturated or epoxidized, aliphatic or aromatic monovalent hydrocarbyl radical;

wherein m is the equivalence of the Y nucleus and is in the range of 4 to 8;

wherein n, p, q and r are individually in the range of 0 to 1;

wherein the average s is in the range of 0 to 2;

wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1.2 to about 10.

3. The curable composition of claim 1 wherein the acryloyl compound is represented by the formula:

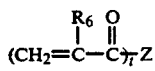

where $R_6$ is selected from the group consisting of H, $CH_3$ and $C_2H_5$, where t is an integer in the range of 2 to 10 and Z is a saturated or ethylenically unsaturated residue of a polyol, a poly(carboxylic acid), a polyamine, a polyepoxide, a polyisocyanate or a polymethylol amino resin, of a number average molecular weight less than about 4000 containing a hydrocarbon, ester, amide, ether, urethane or amino resin backbone.

4. The curable composition of claim 1 wherein the non-aromatic amine is of amine hydrogen equivalent weight in the range of 15 to 1000 and amine hydrogen equivalence in the range of 2.2 to 10.

5. The curable composition of claim 2 wherein Y is a melamine nucleus, wherein the A group is $CH_2OR_2$ or H, $R_2$ being selected from methyl, butyl, pentyl and 2-ethylhexyl, wherein the B group is $CH_2NHCOCH=CH_2$, wherein the C group is

wherein the average number of melamine nuclei per molecule is in the range of about 1 to about 3 and wherein the average number H groups per melamine nucleus is in the range of 0 to 1, the average number of $CH_2OR$ groups per melamine nucleus is in the range of 1 to 3, the average number of B groups per melamine nucleus is in the range of 0 to 1 and the average number of C groups per melamine nucleus is in the range of 2 to 3.

6. The curable composition of claim 5 wherein the acryloyl compound is represented by the formula:

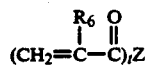

where $R_6$ is selected from the group consisting of H, $CH_3$ and $C_2H_5$, where t is an integer in the range of 2 to 10 and Z is a saturated or ethylenically unsaturated residue of a polyol, a poly(carboxylic acid), a polyamine, a polyepoxide a polyisocyanate or a polymethylol amino resin, of a number average molecular weight less than about 4000 containing a hydrocarbon, ester, amide, ether, urethane or amino resin backbone.

7. The curable composition of claim 6 wherein the non-aromatic amine is of amine hydrogen equivalent weight in the range of 15 to 1000 and amine hydrogen equivalence in the range of 2.2 to 10.

8. The curable composition of claim 1 wherein the equivalent ratio of acryloyl compound to glycidamide is in the range of about 0.2 to about 0.8 and wherein the equivalent ratio of amine to acryloyl compound and glycidamide is in the range of about 0.7 to about 1.3.

9. The curable composition of claim 8 wherein the glycidamide is represented by the formula $Y(R)_m$, wherein Y is a nucleus selected from the group consisting of:

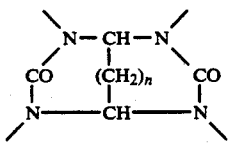

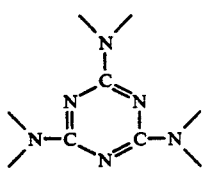

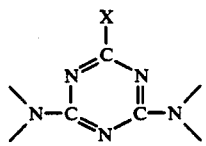

and

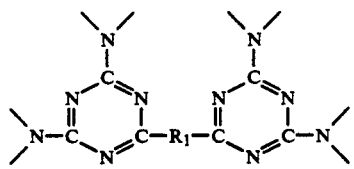

wherein R is selected from the group consisting of:

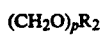   A.

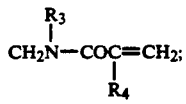   B.

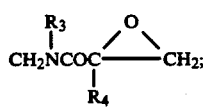   C.

and

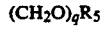   D.

wherein $R_1$ is a $C_1$ to $C_{10}$, linear or branched or cyclic, saturated or unsaturated or epoxidized, divalent hydrocarbyl radical;

wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H;

wherein $R_3$ and $R_4$ are individually selected from hydrogen and methyl;

wherein $R_5$ is $[Y(R)_{m-2}—(CH_2O)_r—CH_2-]_s—Y(R)_{m-1}$;

wherein X is H or a $C_1$ to $C_{10}$, linear or branched or cyclic, saturated or unsaturated or epoxidized, aliphatic or aromatic monovalent hydrocarbyl radical;

wherein m is the equivalence of the Y nucleus and is in the range of 4 to 8;

wherein n, p, q and r are individually in the range of 0 to 1;

wherein the average s is in the range of 0 to 2;

wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1.2 to about 10;

wherein the acryloyl compound is represented by the formula:

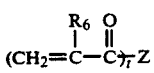

where $R_6$ is selected from the group consisting of H, $CH_3$ and $C_2H_5$, where t is an integer in the range of 1 to 10 and Z is a saturated or ethylenically unsaturated residue of a polyol, a poly(carboxylic acid), a polyamine, a polyepoxide, a polyisocyanate or a polymethylol amino resin, of a number average molecular weight less than about 4000 containing a hydrocarbon, ester, amide, ether, urethane or amino resin backbone, and wherein the non-aromatic amine is of amine hydrogen equivalent weight in the range of 15 to 1000 and amine hydrogen equivalence in the range of 2.2 to 10.

10. The curable composition of claim 9 wherein the amine is selected from the group consisting of ethylenediamine; 1,4-butylenediamine; 1,6-hexamethylenediamine; 1,2-cyclohexamethylenediamine; isophoronediamine; trimethyl-1,6-hexamethylenediamine; N,N′-bis-(2-aminoethyl)piperazine, paramenthanediamine; 1,3-bis-(aminoethyl)cyclohexane; 1,4-diaminocyclohexane; bis-(4-amino-3-methylcyclohexyl)methane; 2,2′-bis-(4-aminocyclohexyl)propane; polyoxypropylenediamine; diethylenetriamine; dipropylenetriamine; polyoxypropylene-triamine; triethylenetetramine; tetraethylenepentamine; bis(hexamethylene)triamine; adducts obtained from the addition reaction of polyamines and poly(meth)-acryloyl compounds; and the condensation products of fatty acids and polyamines.

11. A curable composition comprising:

(A) a first package comprising a glycidamide containing more than one glycidamide group per molecule and an acryloyl compound containing more than one acryloyl group per molecule selected from $CH_2=CHCO$, $CH_2=CH(CH_3)CO$ and $CH_2=C(C_2H_5)CO$; and (B) a second package comprising a non-aromatic amine containing more than 2 amine hydrogen atoms per molecule; wherein the equivalent ratio of acryloyl compound to glycidamide is in the range of about 0.1 to about 1.5 and wherein the equivalent ratio of amine to acryloyl compound and glycidamide is in the range of about 0.3 to about 1.5.

12. The curable composition of claim 11 wherein the glycidamide is represented by the formula $Y(R)_m$, wherein Y is a nucleus selected from the group consisting of:

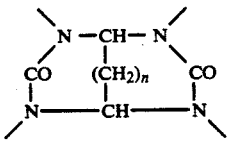

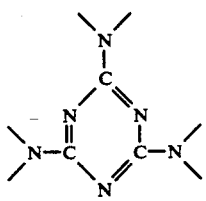

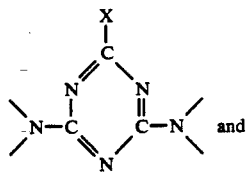

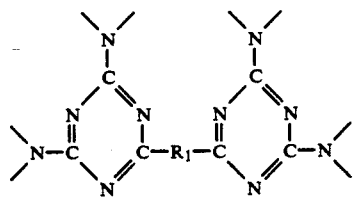

wherein R is selected from the group consisting of:

     A.

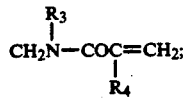     B.

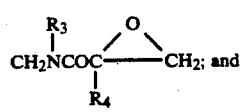     C.

     D.

wherein $R_1$ is a $C_1$ to $C_{10}$, linear or branched or cyclic, saturated or unsaturated or epoxidized, divalent hydrocarbyl radical;

wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H;

wherein $R_3$ and $R_4$ are individually selected from hydrogen and methyl;

wherein $R_5$ is $[Y(R)_{m-2}(CH_2O)_r-CH_2]_s Y(R)_{m-1}$;

wherein X is H or a $C_1$ to $C_{10}$, linear or branched or cyclic, saturated or unsaturated or epoxidized, aliphatic or aromatic monovalent hydrocarbyl radical;

wherein m is the equivalence of the Y nucleus and is in the range of 4 to 8;

wherein n, p, q and r are individually in the range of 0 to 1;

wherein the average s is in the range of 0 to 2;

wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1.2 to about 10.

13. The curable composition of claim 11 wherein the acryloyl compound is represented by the formula:

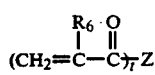

where $R_6$ is selected from the group consisting of H, $CH_3$ and $C_2H_5$, where t is an integer in the range of 2 to 10 and Z is a saturated or ethylenically unsaturated residue of a polyol, a poly(carboxylic acid), a polyamine, a polyepoxide a polyisocyanate or a polymethylol amino resin, of a number average molecular weight less than about 4000 containing a hydrocarbon, ester, amide, ether, urethane or amino resin backbone.

14. The curable composition of claim 11 wherein the non-aromatic amine is of amine hydrogen equivalent weight in the range of 15 to 1000 and amine hydrogen equivalence in the range of 2.2 to 10.

15. The curable composition of claim 11 wherein the equivalent ratio of acryloyl compound to glycidamide is in the range of about 0.2 to about 0.8 and wherein the equivalent ratio of amine to acryloyl compound and glycidamide is in the range of about 0.7 to about 1.3.

16. The curable composition of claim 15 wherein the glycidamide is represented by the formula $Y(R)_m$, wherein Y is a nucleus selected from the group consisting of:

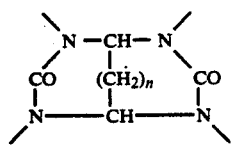

-continued

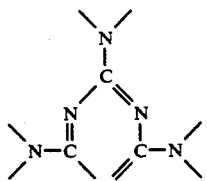

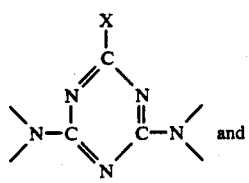
and

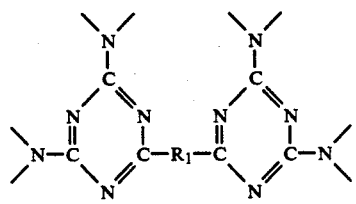

wherein R is selected from the group consisting of:

   A.

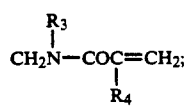   B.

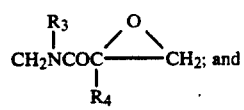   C.

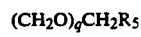   D.

wherein $R_1$ is a $C_1$ to $C_{10}$, linear or branched or cyclic, saturated or unsaturated or epoxidized, divalent hydrocarbyl radical;

wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H;

wherein $R_3$ and $R_4$ are individually selected from hydrogen and methyl;

wherein $R_5$ is $[Y(R)_{m-2}(CH_2O)_r CH_2]_s-Y(R)_{m-1}$;

wherein X is H or a $C_1$ to $C_{10}$, linear or branched or cyclic, saturated or unsaturated or epoxidized, aliphatic or aromatic monovalent hydrocarbyl radical;

wherein m is the equivalence of the Y nucleus and is in the range of 4 to 8;

wherein n, p, q and r are individually in the range of 0 to 1;

wherein the average s is in the range of 0 to 2;

wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1.2 to about 10;

wherein the acryloyl compound is represented by the formula:

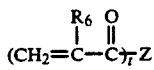

where $R_6$ is selected from the group consisting of H, $CH_3$ and $C_2H_5$, where t is an integer in the range of 2 to 10 and Z is a saturated or ethylenically unsaturated residue of a polyol, a poly(carboxylic acid), a polyamine, a polyepoxide, a polyisocyanate or a polymethylol amino resin, of a number average molecular weight less than about 4000 containing a hydrocarbon, ester, amide, ether, urethane or amino resin backbone, and wherein the non-aromatic amine is of equivalent weight in the range of 15 to 1000 and equivalence in the range of 2.2 to 10.

17. The curable composition of claim 16 wherein the amine is selected from the group consisting of ethylenediamine; 1,4-butylenediamine; 1,6-hexamethylenediamine; 1,2-cyclohexamethylenediamine; isophoronediamine; trimethyl-1,6-hexamethylene diamine; N,N'-bis-(2-aminoethyl)piperazine, paramenthanediamine; 1,3-bis-(aminoethyl)cyclohexane; 1,4-diaminocyclohexane; bis-(4-amino-3-methylcyclohexyl)methane; 2,2'-bis-(4-aminocyclohexyl)propane; polyoxypropylenediamine; diethylenetriamine; dipropylenetriamine; polyoxypropylene-triamine; triethylenetetramine; tetraethylenepentamine, bis(hexamethylene)triamine; adducts obtained from the addition reaction of polyamines and poly(meth)-acryloyl compounds; and the condensation products of fatty acids and polyamines.

18. A composition comprising a glycidamide containing more than one glycidamide group per molecule and an acryloyl compound containing more than one acryloyl group per molecule selected from $CH_2=CHCO$, $CH_2=CH(CH_3)CO$ and $CH_2=CH(C_2H_5)CO$.

19. The composition of claim 18 wherein the glycidamide is represented by the formula $Y(R)_m$, wherein Y is a nucleus selected from the group consisting of:

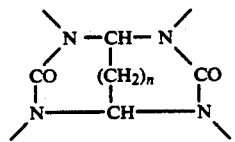

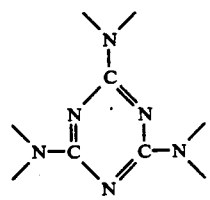

-continued

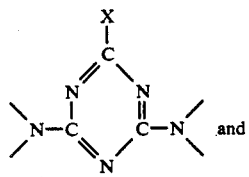 and

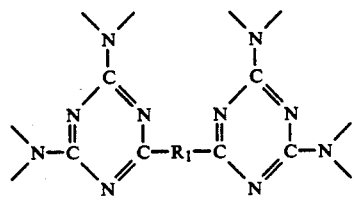

wherein R is selected from the group consisting of:

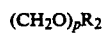      A.

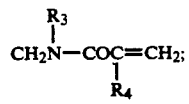      B.

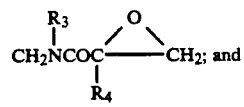      C.

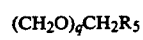      D.

wherein $R_1$ is a $C_1$ to $C_{10}$, linear or branched or cyclic, saturated or unsaturated or epoxidized, divalent hydrocarbyl radical;

wherein $R_2$ is H, or a $C_1$ to $C_{10}$, linear or branched or cyclic, saturated or unsaturated or epoxidized, aliphatic or aromatic monovalent hydrocarbyl radical but not more than one $R_2$ per Y nucleus is H;

wherein $R_3$ and $R_4$ are individually selected from hydrogen and methyl;

wherein $R_5$ is $[Y(R)_{m-2}(CH_2O)_r—CH_2]_s—Y(R)_{m-1}$;

wherein X is H or a $C_1$ to $C_{10}$, linear or branched or cyclic, saturated or unsaturated or epoxidized, aliphatic or aromatic monovalent hydrocarbyl radical;

wherein m is the equivalence of the Y nucleus and is in the range of 4 to 8;

wherein n, p, q and r are individually in the range of 0 to 1;

wherein the average s is in the range of 0 to 2;

wherein the average number of A groups per Y nucleus is in the range of 1 to m−1, the average number of B groups per Y nucleus is in the range of 0 to m−2, the average number of C groups per Y nucleus is in the range of 1 to m−1 and wherein the average number of Y nuclei per molecule is in the range of about 1 to about 4 and the average number of C groups per molecule is in the range of about 1.2 to about 10.

20. The composition of claim 18 wherein the acryloyl compound is represented by the formula:

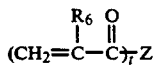

where $R_6$ is selected from the group consisting of H, $CH_3$ and $C_2H_5$, where t is an integer in the range of 2 to 10 and Z is a saturated or ethylenically unsaturated residue of a polyol, a poly(carboxylic acid), a polyamine, a polyepoxide, a polyisocyanate or a polymethylol amino resin, of a number average molecular weight less than about 4000 containing a hydrocarbon, ester, amide, ether, urethane or amino resin backbone.

21. The composition of claim 18 wherein the equivalent ratio of acryloyl compound to glycidamide is in the range of about 0.1 to about 1.5.

22. The composition of claim 18 wherein the equivalent ratio of acryloyl compound to glycidamide in the range of about 0.2 to about 0.8.

23. An article coated with the composition of claim 1.
24. An article coated with the composition of claim 5.
25. An article coated with the composition of claim 8.
26. An article coated with the composition of claim 9.
27. An article coated with the composition of claim 10.
28. The curable composition of claim 17 wherein Y is a melamine nucleus, wherein the A group is $CH_2OR_2$ or H, $R_2$ being selected from methyl, butyl, pentyl and 2-ethylhexyl, wherein the B group is $CH_2NHCOCH=CH_2$, wherein the C group is

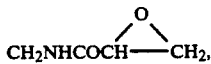

wherein the average number of melamine nuclei per molecule is in the range of about 1 to about 3 and wherein the average number H groups per melamine nucleus is in the range of 0 to 1, the average number of $CH_2OR$ groups per melamine nucleus is in the range of 1 to 3, the average number of B groups per melamine nucleus is in the range of 0 to 1 and the average number of C groups per melamine nucleus is in the range of 2 to 3.

* * * * *